United States Patent

Morooka

[11] Patent Number: 5,448,411
[45] Date of Patent: Sep. 5, 1995

[54] ZOOM TYPE OF FINDER OPTICAL ARRANGEMENT

[75] Inventor: Masaru Morooka, Tokyo, Japan

[73] Assignee: Olympus Optical Co., Ltd., Tokyo, Japan

[21] Appl. No.: 85,164

[22] Filed: Jul. 2, 1993

[30] Foreign Application Priority Data

Jul. 6, 1992 [JP] Japan .................. 4-177923

[51] Int. Cl.⁶ .................. G02B 15/14; G03B 13/08
[52] U.S. Cl. .................. 359/676; 359/432; 354/222; 354/225; 354/94
[58] Field of Search ........... 359/362, 432, 643, 646, 359/676, 677, 680, 691–693, 726, 738–740, 708, 722; 354/222, 225, 94

[56] References Cited

U.S. PATENT DOCUMENTS

| | | | |
|---|---|---|---|
| 4,639,111 | 1/1987 | Harvey | 354/222 X |
| 4,909,614 | 3/1990 | Itoh et al. | 359/708 |
| 4,972,216 | 11/1990 | Ueda et al. | 354/225 |
| 5,255,030 | 10/1993 | Mukai et al. | 354/94 |
| 5,257,055 | 10/1993 | Cho et al. | 354/222 |
| 5,309,278 | 5/1994 | Ito et al. | 359/691 |

FOREIGN PATENT DOCUMENTS

| | | |
|---|---|---|
| 61-254915 | 11/1986 | Japan . |
| 1129224 | 5/1989 | Japan . |
| 1129225 | 5/1989 | Japan . |
| 287109 | 12/1991 | Japan .................. 359/726 |
| 455016 | 5/1992 | Japan . |
| 4153618 | 5/1992 | Japan . |

*Primary Examiner*—Loha Ben
*Assistant Examiner*—Thong Nguyen
*Attorney, Agent, or Firm*—Cushman, Darby & Cushman

[57] ABSTRACT

The invention is directed to a zoom type of finder optical arrangement which, even when the magnification of finder is increased by changing the focal length of the eyepiece system, is less likely or unlikely to undergo aberration fluctuations and kept stationary in respect of the eye point location, and comprises an objective lens system a of positive refracting power, reflecting members b and d for image erection, and an eyepiece system of positive refracting power, said eyepiece system comprising a lens unit f of positive refracting power and a lens unit g of negative refracting power, and moved along the optical axis in such a way that the air separation between both the lens units becomes wider, thereby altering the focal length of said eyepiece system to change the magnification of finder.

8 Claims, 8 Drawing Sheets

FIG. 1
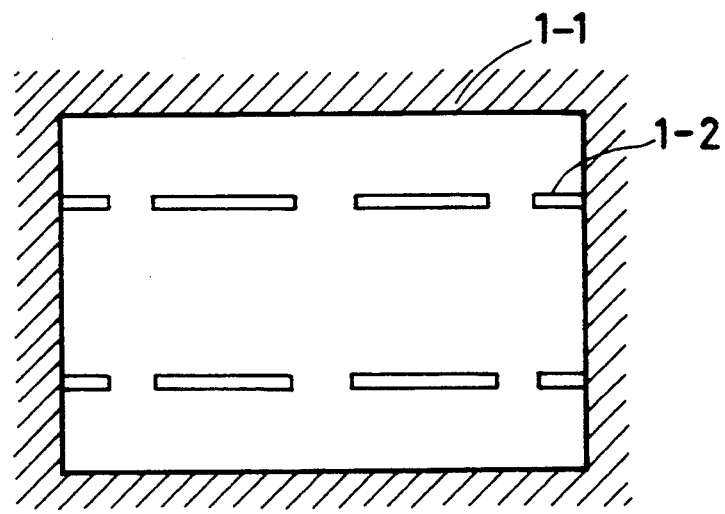
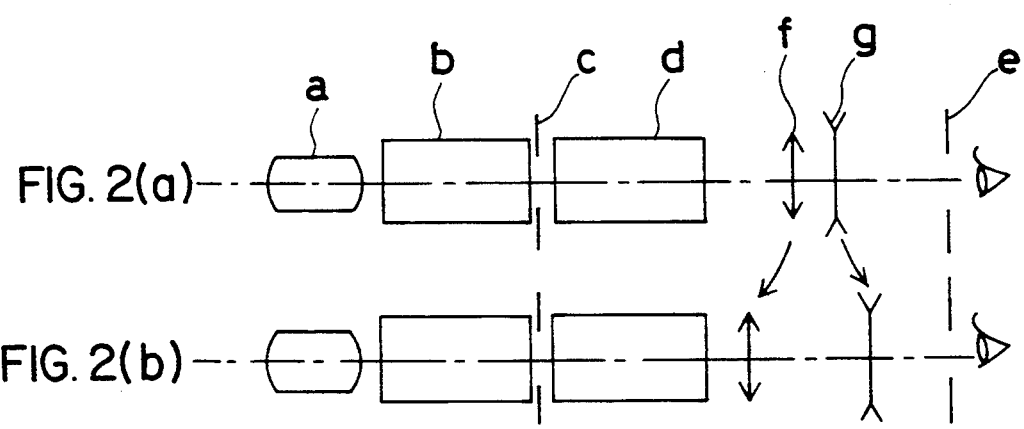
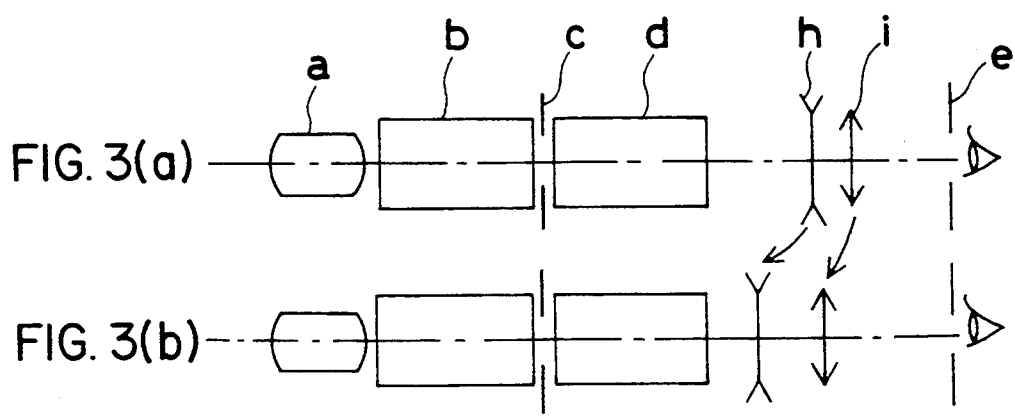

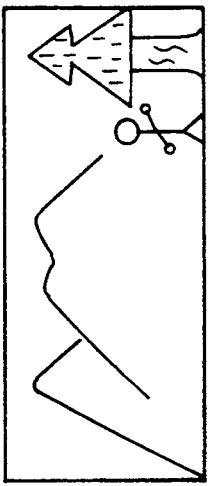
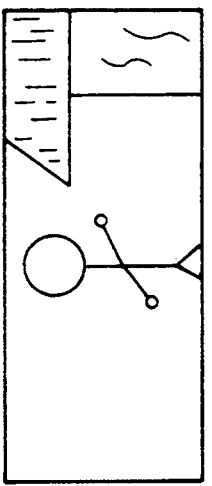
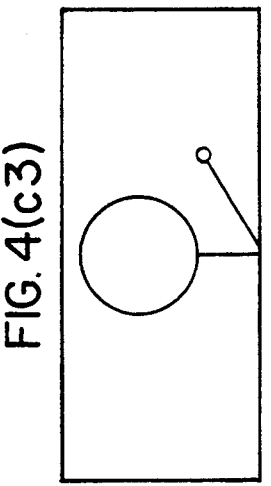
FIG. 4(a1) Normal shooting
FIG. 4(b1) Use of light shielding member for trimming
FIG. 4(c1) Change in the magnification of finder due to eyepiece system
FIG. 4(a2)
FIG. 4(b2)
FIG. 4(c2)
FIG. 4(a3)
FIG. 4(b3)
FIG. 4(c3)
Wide angle setting
Intermediate setting
Telephoto setting

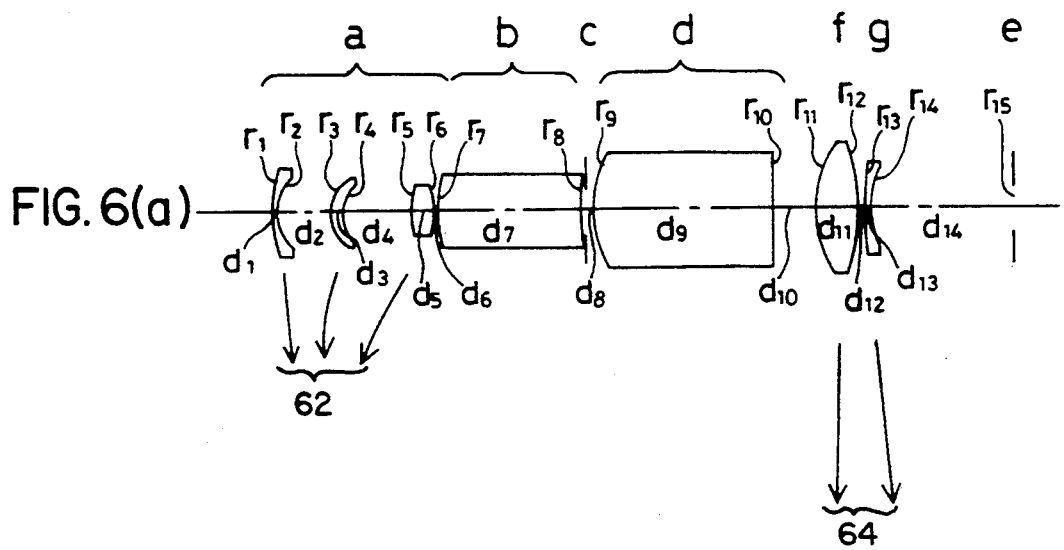
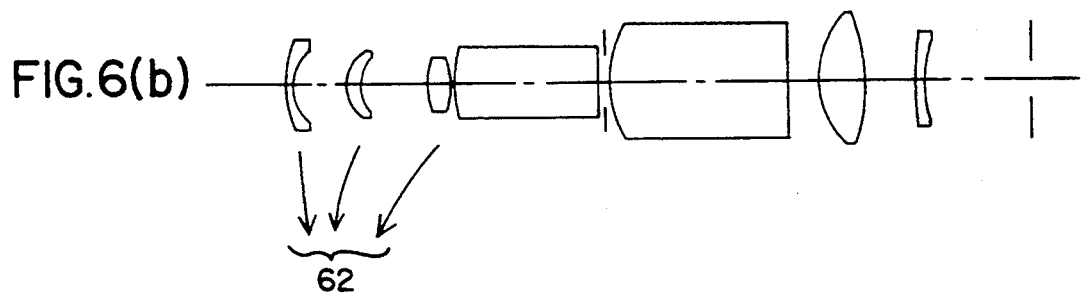
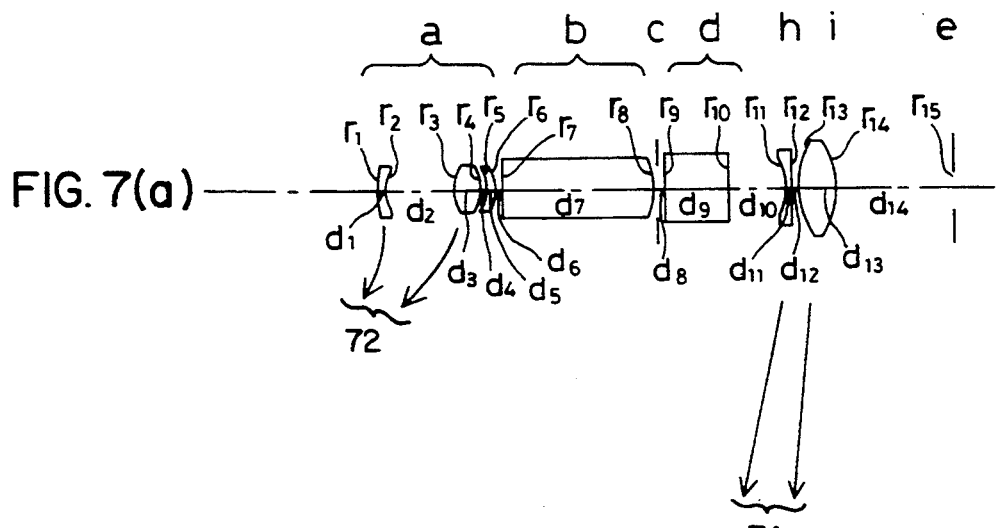
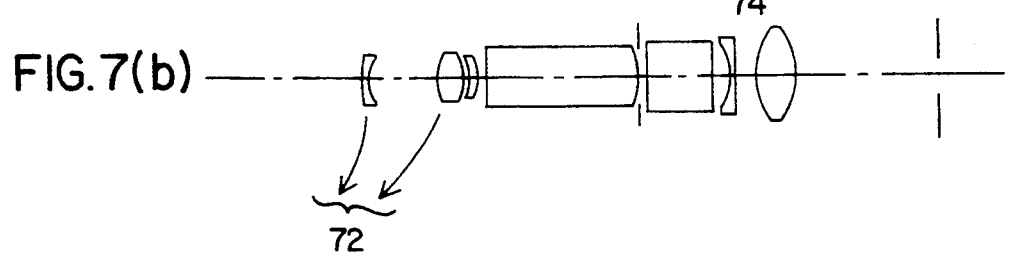

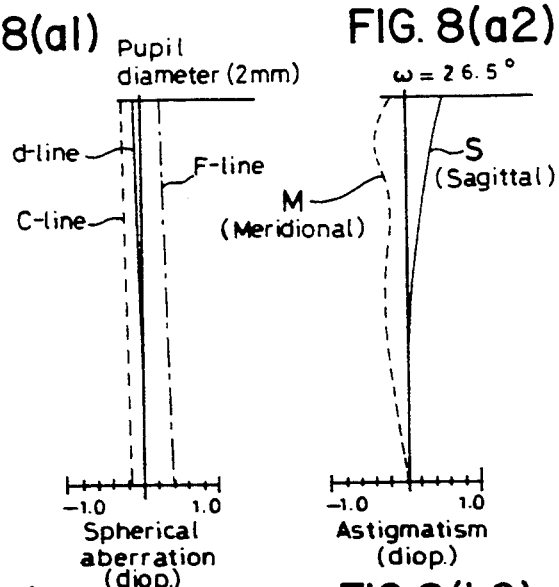
FIG. 8(a1) Pupil diameter (2mm)
FIG. 8(a2) ω = 26.5°
FIG. 8(a3) ω = 26.5°
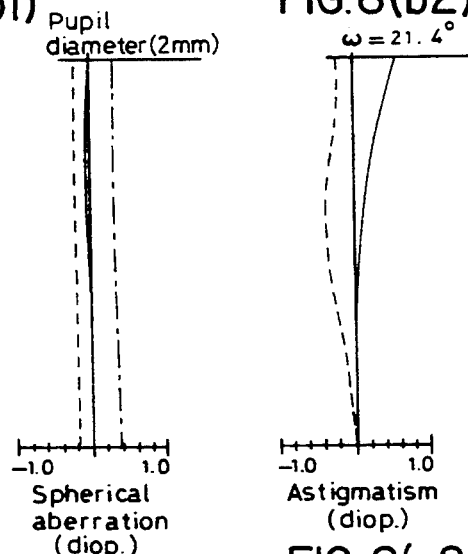
FIG. 8(b1) Pupil diameter (2mm)
FIG. 8(b2) ω = 21.4°
FIG. 8(b3) ω = 21.4°
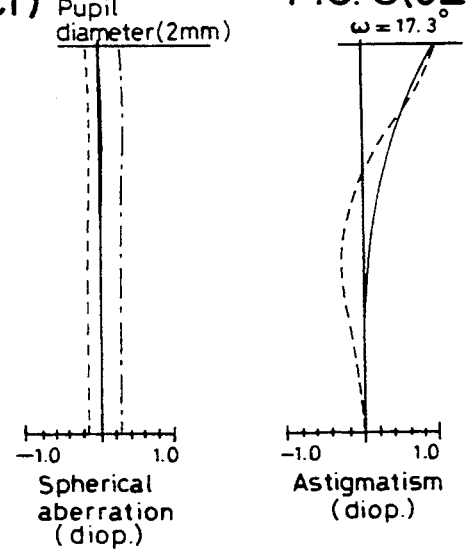
FIG. 8(c1) Pupil diameter (2mm)
FIG. 8(c2) ω = 17.3°
FIG. 8(c3) ω = 17.3°

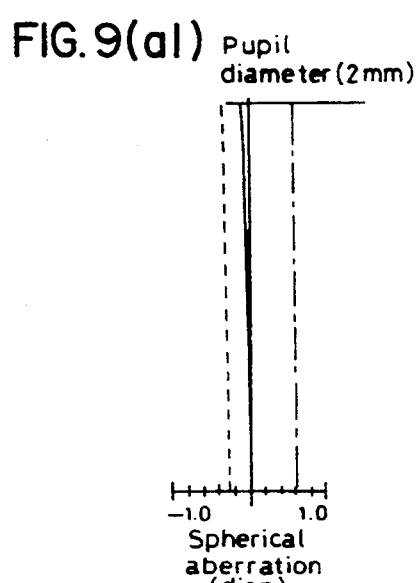
FIG. 9(a1) Pupil diameter (2mm)
Spherical aberration (diop.)
FIG. 9(a2) ω=26.3°
Astigmatism (diop.)
FIG. 9(a3) ω=26.3°
Distortion (%)
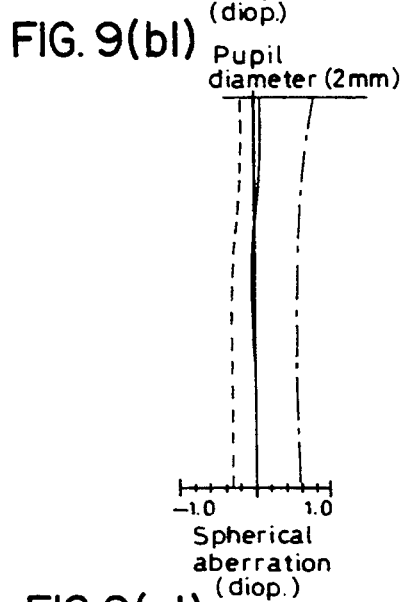
FIG. 9(b1) Pupil diameter (2mm)
Spherical aberration (diop.)
FIG. 9(b2) ω=20.8°
Astigmatism (diop.)
FIG. 9(b3) ω=20.8°
Distortion (%)
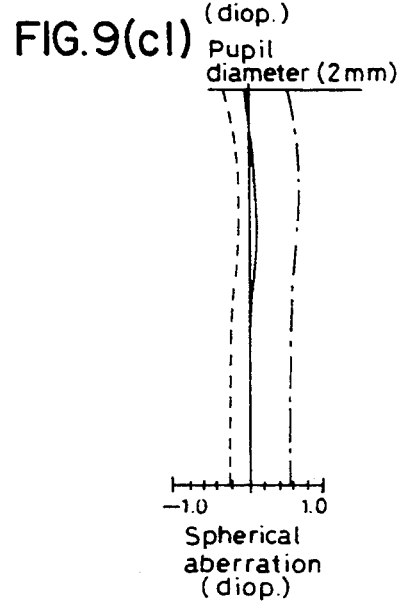
FIG. 9(c1) Pupil diameter (2mm)
Spherical aberration (diop.)
FIG. 9(c2) ω=16.9°
Astigmatism (diop.)
FIG. 9(c3) ω=16.9°
Distortion (%)

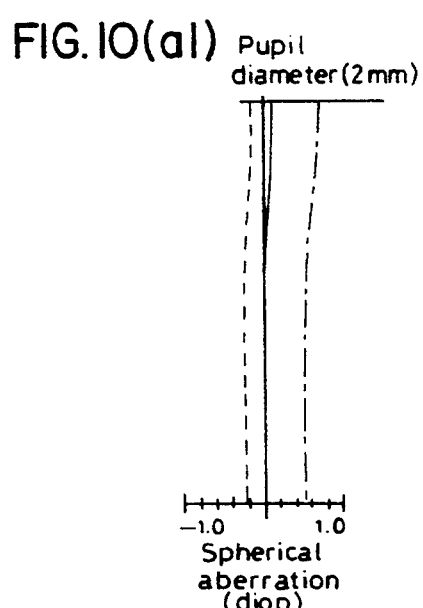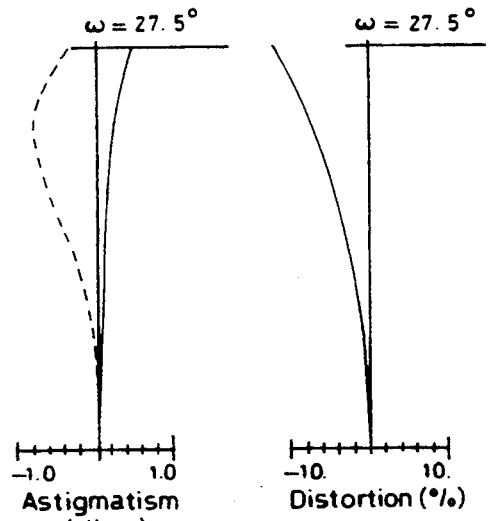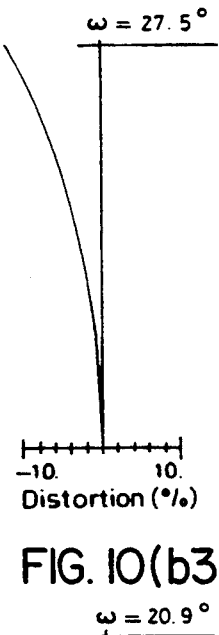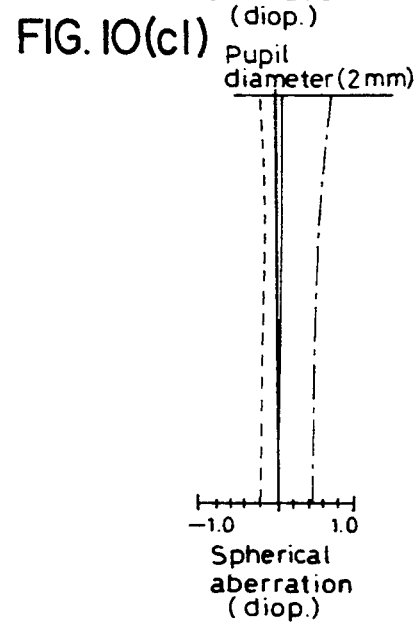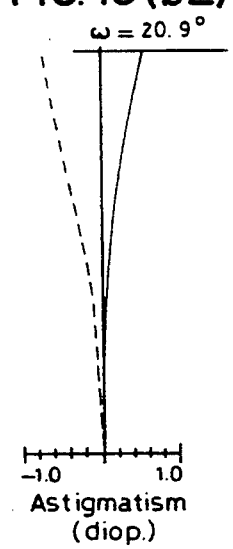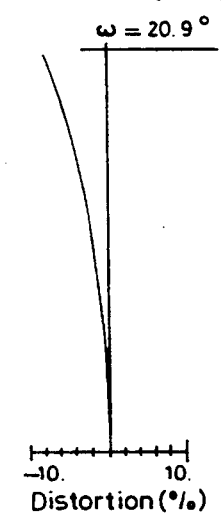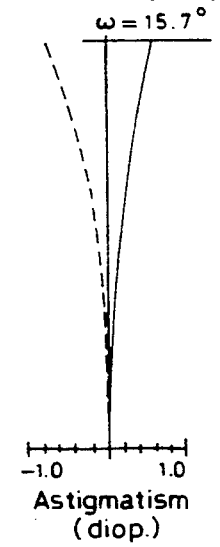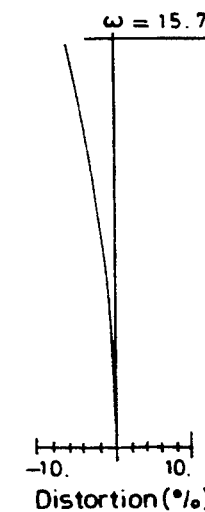

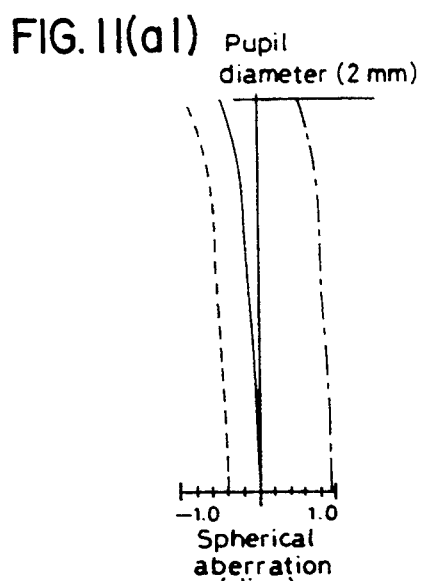
FIG. 11(a1) Pupil diameter (2 mm)
Spherical aberration (diop.)
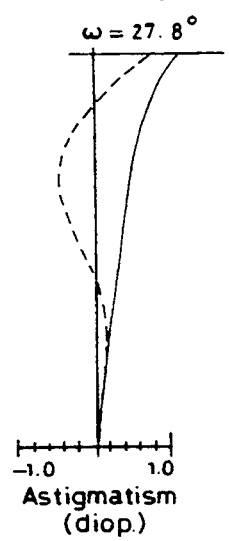
FIG. 11(a2) ω = 27.8°
Astigmatism (diop.)
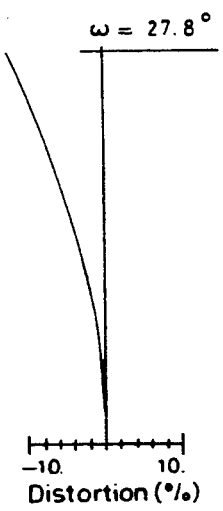
FIG. 11(a3) ω = 27.8°
Distortion (%)
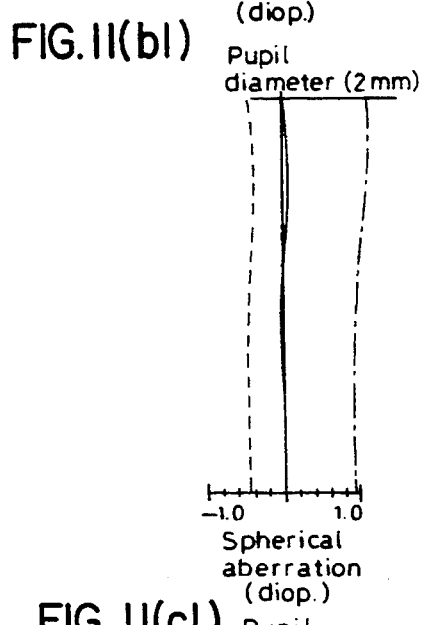
FIG. 11(b1) Pupil diameter (2 mm)
Spherical aberration (diop.)
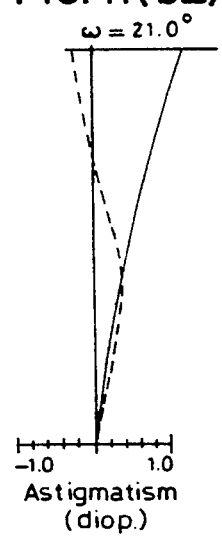
FIG. 11(b2) ω = 21.0°
Astigmatism (diop.)
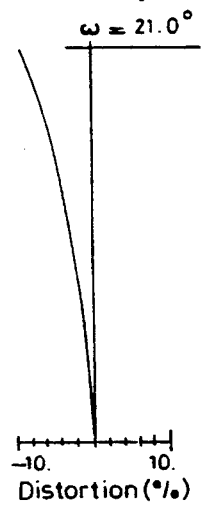
FIG. 11(b3) ω = 21.0°
Distortion (%)
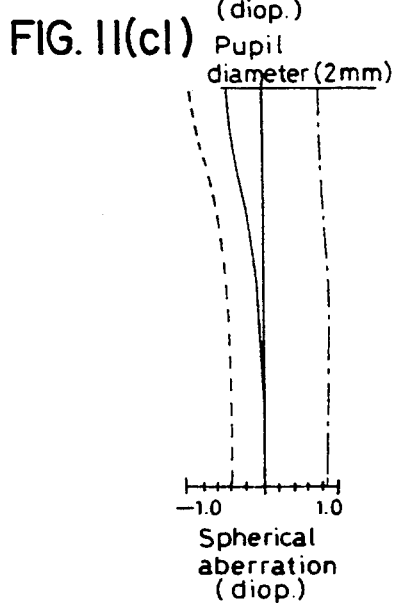
FIG. 11(c1) Pupil diameter (2 mm)
Spherical aberration (diop.)
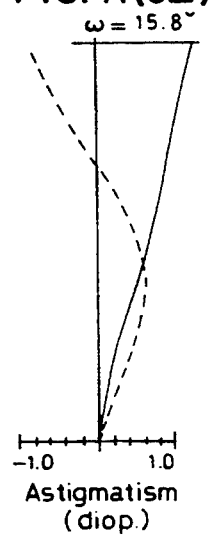
FIG. 11(c2) ω = 15.8°
Astigmatism (diop.)
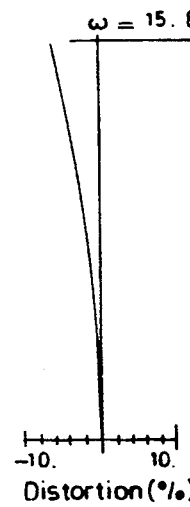
FIG. 11(c3) ω = 15.8°
Distortion (%)

ZOOM TYPE OF FINDER OPTICAL ARRANGEMENT

The present invention relates to a finder optical arrangement that is used on a camera capable of changing the size of film on which the subject is to be taken and to thereby change the shooting range, esp., on a camera in which a taking optical system is separate from a finder optical system to make trimming photography or shooting possible, whereby the magnification of the finder can be changed in association with the size of film.

In recent years, trimming shooting has become popular, according to which the film plane is partly trimmed away to make a well-balanced state with respect to the subject for partial enlargement. This is particularly true of panoramic shooting carried out with a camera of 35 mm film size, in which light shielding plates are mounted on the upper and lower portions near to the film plane to make the range of the film, on which the subject is to be taken, oblong, thus enabling the picture to contain a wide view.

A conventional finder used on a camera for trimming shooting has a viewing screen frame for indicating the range of film on which the subject is to be taken, but this viewing screen frame is designed to indicate the frames for the for the normal and panoramic shooting modes at the same time. Most finders so far available for panoramic shooting, a typical one of which is shown in FIG. 1, are designed such that panoramic frames 12 for indicating the vertical shooting range for panoramic shooting are marked within a viewing screen frame 1-1 for normal shooting.

During normal shooting, these panoramic frames overlap a field image, and so are undesired for shooting. In addition, objects other than the subject to be taken are so viewed that it is difficult to imagine how the picture will look when finished.

This defect may be solved by changing the viewing screen frame for panoramic shooting to make the vertical range narrow. However, this results in a reduction of the area of the finder occupied by the field of view, giving the photographer a diminutive impression.

In order to avoid this, it has been proposed to change the focal length of an eyepiece system, thereby increasing the magnification of the finder and so extending the field to be viewed, as disclosed in JP-A-1-129224 and 1-129225.

However, all these conventional arrangements undergo large aberration fluctuations before and after zooming, and cause the eye points to be so moved that the viewers have difficulty in viewing the subjects.

SUMMARY OF THE INVENTION

In view of such situations as mentioned above, it is an object of the invention to provide a zoom type of finder optical arrangement which, even when used on a camera designed to be capable of carrying out the conversion from the normal to panoramic shooting mode, or the reverse, can change the viewing screen frame for panoramic shooting to provide a precise indication of the shooting range within the finder; which, even when the viewing range is extended by increasing the magnification of finder, is less likely or unlikely to undergo aberration fluctuations and which permits the eye point location to remain unmoved so that the image is easy to view.

According to one aspect of the invention, the object mentioned above is achieved by the provision of a zoom type of finder optical arrangement which comprises:

an objective lens system including a plurality of lens units and having positive refracting power in general, wherein at least one lens unit is moved along the optical axis, thereby altering the focal length from the wide angle to telephoto end, a reflecting member for erecting the image formed by the objective lens system, a light-shielding member for trimming, which is located in such a way that at least a region of the image formed by the objective lens system can be shielded from light, and an eyepiece system including a positive lens unit of positive refracting power and a negative lens unit of negative refracting power, wherein the positive and negative lens units are moved along the optical axis to change the space therebetween, thereby changing the magnification of the finder so as to enlarge the image cut by the light-shielding member for trimming, and which further satisfies the following condition (1):

$$1.5 < |f_M/f_p| < 50 \tag{1}$$

where $f_M$ is the focal length of the negative lens unit of the eyepiece system and $f_p$ is the focal length of the positive lens unit of the eyepiece system.

According to another aspect of the invention, there is provided a zoom type of finder optical arrangement which comprises:

an objective lens system including a plurality of lens units and having positive refracting power in general, wherein at least one lens unit is moved along the optical axis, thereby altering the focal length from the wide angle to telephoto end, a reflecting member for erecting the image formed by the objective lens system, a light-shielding member for trimming, which is located in such a way that at least a region of the image formed by the objective lens system can be shielded from light, and an eyepiece system comprising a positive lens unit consisting of one positive lens element and a negative lens unit consisting of one negative lens element, wherein the positive and negative lens units are moved along the optical axis to change the space therebetween, thereby changing the magnification of the finder so as to enlarge the image cut by the light-shielding member for trimming.

In either case, the eyepiece system may comprise, in order from the object side, a positive lens unit with an air separation between the reflection member and it, and a negative lens unit with an air separation between the positive lens unit and it. In that case, the positive lens unit is moved toward the object side in the conversion from the normal to panoramic shooting mode, and the negative lens unit is moved toward the eye point side in the conversion from the normal to panoramic shooting mode.

Alternatively, the eye piece system may comprise, in order from the object side, a negative lens unit with an air separation between the reflection member and it, and a positive lens unit with an air separation between the negative lens unit and it. In that case, the negative lens unit is moved toward the object side in the conversion from the normal to panoramic shooting mode, and the positive lens unit is moved toward the object side in the conversion from the normal to panoramic mode. In this connection, it is desired that the space between the negative and positive lens units become wider in the conversion from the normal to panoramic shooting mode.

According to each of the zoom type of finder optical arrangements of the invention, the objective lens system may comprise a plurality of lens units, which are then moved along the optical axis for zooming from the wide angle to telephoto end. Independently of the wide angle to telephoto zooming, the eye piece system is moved to convert the normal to the panoramic shooting mode. Also, a viewing screen frame may be located between the surface of the objective lens system proximate to the eye point side and the surface of the eyepiece system proximate to the object side, and means for shielding at least a region of this field frame from light may be provided, which works in association with the conversion from the normal to the panoramic shooting mode by the movement of the eyepiece system.

The action of the zoom type of finder optical arrangements according to the invention will now be explained, more specifically but not exclusively, with reference to FIGS. 2 and 3, wherein a stands for an objective lens system, b and d each represent a reflecting member for erecting the image formed by the objective lens system a, c denotes a viewing screen frame indicating a shooting range in the vicinity of the image formed by the objective lens system, f and i each show an eyepiece unit of positive refracting power, g and h each show an eyepiece unit of negative refracting power, and e denotes an eye point. It is also noted that FIGS. 2(a) and 3(a) show the normal shooting mode, and that FIGS. 2(b) and 3(b) show the panoramic shooting mode.

For panoramic shooting according to the invention, the magnification of the finder can be increased by moving at least one positive lens unit f (i) of the eyepiece system and at least one negative lens unit g (h) of the eyepiece system on the optical axis to widen the air separation between both the lens units f (i) and g (h) thereby making the focal length of the eyepiece system shorter, as can be best seen from FIGS. 2(a), 2(b), 3(a) and 3(b). However, it is here noted that the eye point location e remains unmoved.

Further, it is desired that the conditional equation (1) be satisfied so as to achieve a zoom type of finder which is less likely or unlikely to undergo aberration fluctuations before and after zooming, even when the magnification of the finder is increased by changing the focal length of the eyepiece system while the length from the intermediate image-formation surface c to the eye point e is kept constant.

When the upper limit of equation (1) is exceeded, it is easy to secure the reflecting member for image erection or the eye point length, but it is difficult to keep the length from the intermediate image-formation surface c to the eye point e constant before and after zooming, because of large aberration fluctuations before and after zooming. Below the lower limit, on the other hand, it is easy to keep the length from the intermediate image-formation surface c to the eye point e constant before and after zooming, but it is difficult to secure the reflecting member for image erection or the eye point length, because the refracting power of the positive lens unit becomes too strong.

According to the second aspect of the invention, the positive and negative lens units f and g (i and h) each consist of one lens, whereby the size and cost of the finder can be reduced due to a reduction in the number of lenses used. However, in order to achieve a zoom type finder which is less likely or unlikely to undergo aberration fluctuations before and after zooming, even when the magnification of finder is increased by changing the focal length of the eyepiece system, while the length from the intermediate image formation surface c to the eye point e is kept constant, it is desired that an aspherical surface be applied to at least one surface of the positive lens f (i).

Moreover, the viewing screen frame c for panoramic shooting may be provided with a mechanism which, in association with the conversion from the normal to panoramic shooting mode, shields the upper and lower portions from light, thereby setting up the panoramic shooting range. If this is done, then the scene can be easily viewed for panoramic shooting.

FIGS. 4(a) (1) through 4(c) (3) are a schematic representation of the image viewed, when the observer views it through the finder. Usually, zooming takes place sequentially from the wide angle to an intermediate setting and then to the telephoto setting. In the invention, zooming is achieved during normal shooting, shown in FIG. 4(a), by moving at least one of a plurality of lens units incorporated in the objective lens system along the optical axis.

For instance, when panoramic shooting is performed with the light-shielding member for trimming according to the invention, some regions of the image formed by the objective lens system are shielded from light, as can be best seen from FIG. 4(b). The image is viewed with upper and lower portions cut out. In this case, however, the image is made small because of being cut out, and so offers problems, e.g., a difficult to see problem. According to the invention, therefore, the cut image is enlarged by the eyepiece system, independently of the wide angle to telephoto zooming performed by the objective lens system, thereby enabling the image to look larger, as shown in FIG. 4(c).

It is appreciated that the way to achieve trimming according to the invention is not limited to that illustrated in FIGS. 4(a) through 4(c), wherein the upper and lower edges of the image are shown to be trimmed away. That is, the image may be trimmed by cutting away hatched parts 50, 52 as sketched in FIG. 5(a), the left and right edges 54, 56, as sketched in FIG. 5(b), and all the edges 57, as sketched in FIG. 5(c).

Still other objects and advantages of the invention will be obvious and apparent from the specification.

The invention accordingly comprises the features of construction, the combinations of elements, and the arrangement of parts which will be exemplified in the construction hereinafter set forth, and the scope of the invention will be indicated in the claims.

BRIEF DESCRIPTION OF THE DRAWINGS

FIG. 1 is an illustration of the field of a conventional panoramic finder;

FIGS. 2(a) through 2(b) illustrate the action of one embodiment of the zoom type of finder optical arrangement according to the invention;

FIGS. 3(a) through 3(b) represent the action of another embodiment of the zoom type of finder optical arrangement according to the invention;

FIGS. 4(a) through 4(c) are presented for a better understanding of the invention, and show a series of schematic representations of the image viewed, when the observer sees it through the finder;

FIGS. 6(a) and 6(b) presents sectional illustrations of the lens arrangement of Example 1 according to the invention, FIG. 6(a) showing the wide angle setting for normal shooting and FIG. 6(b) showing the wide angle setting for panoramic shooting;

FIGS. 7(a) and 7(b) present sectional illustrations, similar to those of FIGS. 6(a) and 6(b), of the lens arrangement of Example 2 according to the invention;

FIGS. 8(a) through 8(c) present aberration diagrams showing spherical aberration, astigmatism and distortion of Example 1 at the wide angle FIG. 8(a), intermediate FIG. 8(b) and telephoto FIG. 8(c) settings during normal shooting;

FIGS. 9(a) through 9(c) present aberration diagrams, similar to those of FIGS. 8(a) through 8(c) of Example 1 during panoramic shooting;

FIGS. 10(a) through 10(c) present aberration diagrams, similar to those of FIGS. 8(a) through 8(c), of Example 2 during normal shooting; and FIGS. 11(a) through 11(c) present aberration diagrams, similar to those of FIGS. 8(a) through 8(c), of Example 2 during panoramic shooting.

DESCRIPTION OF THE PREFERRED EMBODIMENTS

Figure 5:
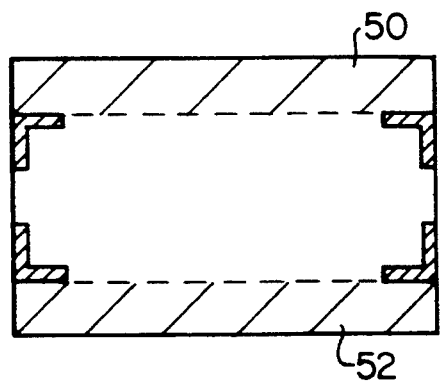
FIGS. 5(a) through 5(c) are a series of sketches illustrating how trimming is achieved according to the invention.
Figure 5:
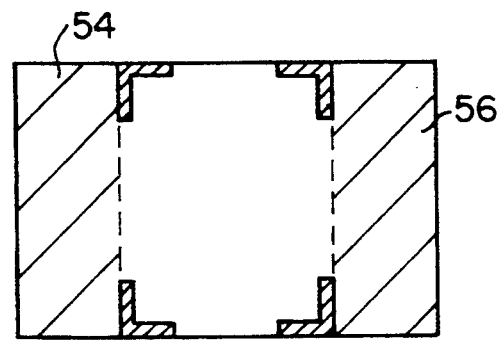
Figure 5:
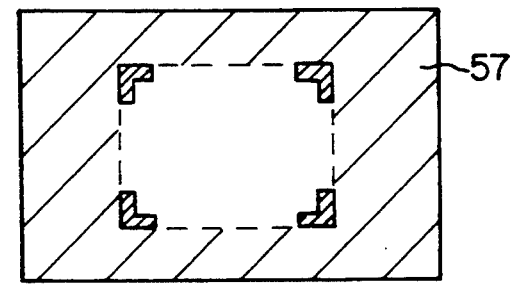

Examples 1 and 2 of the zoom type of finder optical arrangement according to the invention will now be explained, with the lens data enumerated later. FIGS. 6(a) and 6(b) present sectional illustrations of the lens arrangement of Example 1 according to the invention, FIG. 6(a) shows the wide angle setting for normal shooting and FIG. 6(b) shows the wide angle setting for panoramic shooting. The objective lens a is comprised of a negative meniscus lens element that is convex on the subject side, a positive meniscus lens element that is convex on the subject side and a double-convex lens element, three lens elements in all, and the intermediate image due to the objective lens a is formed in the vicinity of the location of the field frame c through the reflecting member b having a lens surface on its entrance side. That image is observed at the eye point e through the reflecting member d having a lens surface on its entrance side and then through the eyepiece system comprising the double-convex positive lens element f and the negative meniscus lens element g that is convex on the subject side. Each of the reflecting members b and d for image erection is a prism for reflecting light twice.

In order to zoom the zoom type of finder optical arrangement from the wide angle to telephoto setting either for normal shooting (FIG. 6(a)) or for panoramic shooting (FIG. 6(b)), the three lens elements forming the objective lens a are moved in the direction shown by arrows 62 in FIGS. 6(a) and 6(b) to alter the focal length. Each lens element is moved along the same locus whether for normal shooting or for panoramic shooting.

Then, in order to change the normal shooting mode (FIG. 6(a)) over to the panoramic shooting mode (FIG. 6(b)), the positive and negative lenses f and g of the eyepiece system are moved along the optical axis in the direction shown by arrows 64 in FIG. 6(a) to widen the air separation between both the lenses f and g and thereby shorten the focal length of the eyepiece system, whereby the magnification of finder is increased. Incorporated in the viewing screen frame c is a variable mechanism, the vertical width of which is so reduced that it can be of a size for panoramic shooting. It is here appreciated that the photographer has no sense of incompatibility during ! the conversion from the normal to panoramic shooting mode, because neither the intermediate image-formation surface nor the eye point location e is moved.

As will be described later, aspherical configurations are applied to five surfaces, i.e., the rear surface of the negative meniscus lens of the objective lens a, the front surface of the positive meniscus lens, the front surface of the double-convex positive lens, the entrance surface of the reflecting member b, and the front surface r11 of the double-convex positive lens element f.

FIGS. 7(a) and 7(b) present sectional illustrations, similar to those of FIGS. 6(a) and 6(b), of the lens arrangement of Example 2 according to the invention. The objective lens a is comprised of a negative meniscus lens element that is convex on the subject side, a double-convex positive lens and a positive meniscus lens element that is convex on the stationary photographer's side, three lens elements in all, and the intermediate image due to the objective lens a is formed in the vicinity of the location of the viewing screen frame c through the reflecting member b having a lens surface on its exit side. That image is observed at the eye point e through the reflecting member d having flat surfaces on both its sides and then through the eyepiece system comprising the negative meniscus lens element h that is convex on the photographer's side and the double convex positive lens element i. The reflecting member b for image erection is a prism that reflects light three times, and the reflecting member d for image erection is a prism that reflects light once.

In order to zoom the zoom type of finder optical arrangement from the wide angle to telephoto setting either for normal shooting (FIG. 7(a)) or for panoramic shooting (FIG. 7(b)), the negative meniscus and double-convex positive lens elements forming the objective lens a are moved in the direction shown by arrows 72 to alter the focal length. Each lens element is moved along the same locus whether during normal shooting or during panoramic shooting.

Then, in order to change the normal shooting mode (FIG. 7(a)) over to the panoramic shooting mode (FIG. 7(b)), the negative and positive lens elements h and i of the eyepiece system are moved along the optical axis in the direction shown by arrows 74 in FIG. 7(a) to widen the air separation between both the lens elements and thereby shorten the focal length of the eyepiece system, whereby the magnification of finder is increased. Incorporated in the viewing screen frame c is a variable mechanism, the vertical width of which is so reduced that it can be of a size fit for panoramic shooting. It is here appreciated that the photographer has no sense of incompatibility during the conversion from the normal to panoramic shooting mode, because neither the intermediate image-formation surface nor the eye point location e is moved.

As will be described later, aspherical configurations are applied to four surfaces, i.e., the rear surface of the negative meniscus lens of the objective lens a, the rear surface of the double-convex positiveslens, the front surface of the positive meniscus lens and the front surface of the double-convex positive lens i of the eyepiece system.

In what follows, the lens data of the zoom type of finder optical arrangements according to Examples 1 and 2 of the invention will be enumerated. In this connection, (a) refers to the normal shooting mode,
(b) to the panoramic shooting mode,
W, S and T to the wide angle, intermediate and telephoto settings, respectively, either on the normal shooting mode or the panoramic shooting mode,
$2\omega$ to the field angle, MG to the magnification of finder,
$r_1, r_2, \ldots$ to radii of curvature of the respective lens surfaces,
$n_{d1}, d_2 \ldots$ to the spaces between the respective lens surfaces,
$n_{d1}, n_{d2} \ldots$ to the d-line refractive indices of the respective lenses, and
$\nu d1, \nu d2, \ldots$ to the Abbe's numbers of the respective lenses.

Let x and y denote the optical axis direction and the direction normal to the optical axis. Then the aspherical configuration is given by $$x = (y^2/r)/[1+\{1-P(y^2/r^2)\}^{\frac{1}{2}}] + A_4 y^4 + A_6 y^6 + A_8 y^8 + A_{10} y^{10}$$

where r is the paraxial radius of curvature, P is the conical coefficient, and $A_4$, $A_6$, $A_8$ and $A_{10}$ are the aspherical coefficients.

EXAMPLE 1

|     |   | $2\omega$ | MG |
|-----|---|-----------|------|
| (a) | W | 53.0° | 0.37 |
|     | S | 42.8° | 0.50 |
|     | T | 34.6° | 0.63 |
| (b) | W | 52.6° | 0.44 |
|     | S | 41.6° | 0.60 |
|     | T | 33.8° | 0.76 |

| | | | | | | |
|---|---|---|---|---|---|---|
| $r_1 =$ | 18.1642 | $d_1 =$ | 1.000 | $n_{d1} =$ | 1.58423 | $\nu_{d1} =$ 30.49 |
| $r_2 =$ | 5.5896 (Aspheric) | $d_2 =$ | (Variable) | | | |
| $r_3 =$ | 5.1152 (Aspheric) | $d_3 =$ | 1.804 | $n_{d2} =$ | 1.49241 | $\nu_{d2} =$ 57.66 |
| $r_4 =$ | 6.5176 | $d_4 =$ | (Variable) | | | |
| $r_5 =$ | 12.9197 (Aspheric) | $d_5 =$ | 3.250 | $n_{d3} =$ | 1.49241 | $\nu_{d3} =$ 57.66 |
| $r_6 =$ | −18.4117 | $d_6 =$ | (Variable) | | | |
| $r_7 =$ | 20.7611 (Aspheric) | $d_7 =$ | 20.500 | $n_{d4} =$ | 1.49241 | $\nu_{d4} =$ 57.66 |
| $r_8 =$ | ∞ | $d_8 =$ | 1.500 | | | |
| $r_9 =$ | 18.0348 | $d_9 =$ | 26.000 | $n_{d5} =$ | 1.49241 | $\nu_{d5} =$ 57.66 |
| $r_{10} =$ | ∞ | $d_{10} =$ | (Variable) | | | |
| $r_{11} =$ | 11.5542 (Aspheric) | $d_{11} =$ | 6.563 | $n_{d6} =$ | 1.49241 | $\nu_{d6} =$ 57.66 |
| $r_{12} =$ | −26.8662 | $d_{12} =$ | (Variable) | | | |
| $r_{13} =$ | 88.5447 | $d_{13} =$ | 1.062 | $n_{d7} =$ | 1.58423 | $\nu_{d7} =$ 30.49 |
| $r_{14} =$ | 20.4724 | $d_{14} =$ | (Variable) | | | |
| $r_{15} =$ | (Eyepoint) | | | | | |

Zooming Spaces

|     |   | $d_2$ | $d_4$ | $d_6$ | $d_{10}$ | $d_{12}$ | $d_{14}$ |
|-----|---|-------|-------|-------|----------|----------|----------|
| (a) | W | 7.988 | 9.275 | 0.594 | 5.875 | 0.365 | 20.534 |
|     | S | 3.674 | 9.034 | 5.263 | 5.875 | 0.365 | 20.534 |
|     | T | 2.846 | 5.894 | 8.727 | 5.875 | 0.365 | 20.534 |
| (b) | W | 7.988 | 9.275 | 0.594 | 4.419 | 7.085 | 15.270 |
|     | S | 3.674 | 9.034 | 5.263 | 4.419 | 7.085 | 15.270 |
|     | T | 2.846 | 5.894 | 8.727 | 4.419 | 7.085 | 15.270 |

Aspherical Coefficients

2nd surface
P = 1
$A_4 =$ −0.77400 × 10$^{-3}$
$A_6 =$ −0.28046 × 10$^{-4}$
$A_8 =$ 0.15072 × 10$^{-5}$
$A_{10} =$ −0.55691 × 10$^{-7}$ 3rd surface
P = 1
$A_4 =$ −0.42686 × 10$^{-3}$
$A_6 =$ −0.11727 × 10$^{-3}$
$A_8 =$ 0.86606 × 10$^{-5}$
$A_{10} =$ −0.28553 × 10$^{-6}$ 5th surface
P = 1
$A_4 =$ −0.24847 × 10$^{-3}$
$A_6 =$ 0.54732 × 10$^{-4}$
$A_8 =$ −0.73647 × 10$^{-5}$
$A_{10} =$ 0.36346 × 10$^{-6}$ 7th surface
P = 1
$A_4 =$ −0.20980 × 10$^{-3}$
$A_6 =$ 0.48279 × 10$^{-5}$
$A_8 =$ −0.16306 × 10$^{-6}$
$A_{10} =$ −0.14031 × 10$^{-8}$ 11th surface
P = 1

-continued

|  |  |
|---|---|
| $A_4 =$ | $-0.17180 \times 10^{-3}$ |
| $A_6 =$ | $0.84457 \times 10^{-6}$ |
| $A_8 =$ | $-0.19735 \times 10^{-7}$ |
| $A_{10} =$ | $0.89295 \times 10^{-10}$ |
| $|f_M/f_P| = 2.64$ | |

EXAMPLE 2

|  |  |  | $2\omega$ | MG |
|---|---|---|---|---|
| (a) | | W | 55.0° | 0.38 |
| | | S | 41.8° | 0.50 |
| | | T | 31.4° | 0.66 |
| (b) | | W | 55.6° | 0.45 |
| | | S | 42.0° | 0.60 |
| | | T | 31.6° | 0.79 |

| | | | | | | |
|---|---|---|---|---|---|---|
| $r_1 =$ | 19.3606 | $d_1 =$ | 1.000 | $n_{d1} =$ | 1.58423 | $\nu_{d1} =$ 30.49 |
| $r_2 =$ | 4.2834 (Aspheric) | $d_2 =$ | (Variable) | | | |
| $r_3 =$ | 8.6765 | $d_3 =$ | 4.000 | $n_{d2} =$ | 1.49241 | $\nu_{d2} =$ 57.66 |
| $r_4 =$ | $-9.6727$ (Aspheric) | $d_4 =$ | (Variable) | | | |
| $r_5 =$ | $-6.5688$ (Aspheric) | $d_5 =$ | 1.515 | $n_{d3} =$ | 1.49241 | $\nu_{d3} =$ 57.66 |
| $r_6 =$ | 6.0224 | $d_6 =$ | 0.500 | | | |
| $r_7 =$ | $\infty$ | $d_7 =$ | 22.211 | $n_{d4} =$ | 1.49241 | $\nu_{d4} =$ 57.66 |
| $r_8 =$ | $-10.2142$ | $d_8 =$ | 1.000 | | | |
| $r_9 =$ | $\infty$ | $d_9 =$ | 10.000 | $n_{d5} =$ | 1.49241 | $\nu_{d5} =$ 57.66 |
| $r_{10} =$ | $\infty$ | $d_{10} =$ | (Variable) | | | |
| $r_{11} =$ | $-11.7641$ | $d_{11} =$ | 1.000 | $n_{d6} =$ | 1.58423 | $\nu_{d6} =$ 30.49 |
| $r_{12} =$ | $-570.2340$ | $d_{12} =$ | (Variable) | | | |
| $r_{13} =$ | 8.6806 (Aspheric) | $d_{13} =$ | 5.500 | $n_{d7} =$ | 1.49241 | $\nu_{d7} =$ 57.66 |
| $r_{14} =$ | $-14.0564$ | $d_{14} =$ | (Variable) | | | |
| $r_{15} =$ | (Eyepoint) | | | | | |

Zooming Spaces

|  |  | $d_2$ | $d_4$ | $d_{10}$ | $d_{12}$ | $d_{14}$ |
|---|---|---|---|---|---|---|
| (a) | W | 9.790 | 0.684 | 7.998 | 0.699 | 16.574 |
| | S | 7.251 | 3.673 | 7.998 | 0.699 | 16.574 |
| | T | 5.308 | 7.638 | 7.998 | 0.699 | 16.574 |
| (b) | W | 9.790 | 0.684 | 1.985 | 3.020 | 20.266 |
| | S | 7.251 | 3.673 | 1.985 | 3.020 | 20.266 |
| | T | 5.308 | 7.638 | 1.985 | 3.020 | 20.266 |

Aspherical Coefficients

2nd surface

| | |
|---|---|
| $P =$ | 1 |
| $A_4 =$ | $-0.16618 \times 10^{-2}$ |
| $A_6 =$ | $0.30507 \times 10^{-3}$ |
| $A_8 =$ | $-0.47167 \times 10^{-4}$ |
| $A_{10} =$ | $0.19877 \times 10^{-5}$ |

4th surface

| | |
|---|---|
| $P =$ | 1 |
| $A_4 =$ | $0.38614 \times 10^{-3}$ |
| $A_6 =$ | $-0.97699 \times 10^{-5}$ |
| $A_8 =$ | $0.59157 \times 10^{-6}$ |
| $A_{10} =$ | $-0.18729 \times 10^{-7}$ |

5th surface

| | |
|---|---|
| $P =$ | 1 |
| $A_4 =$ | $-0.97670 \times 10^{-3}$ |
| $A_6 =$ | $0.89290 \times 10^{-4}$ |
| $A_8 =$ | $-0.24937 \times 10^{-4}$ |
| $A_{10} =$ | $0.18774 \times 10^{-5}$ |

13th surface

| | |
|---|---|
| $P =$ | 1 |
| $A_4 =$ | $-0.65548 \times 10^{-3}$ |
| $A_6 =$ | $0.44394 \times 10^{-5}$ |
| $A_8 =$ | $-0.99340 \times 10^{-7}$ |
| $A_{10} =$ | $-0.52309 \times 10^{-9}$ |
| $|f_M/f_P| = 1.74$ | |

Aberration diagrams showing spherical aberrations, astigmatisms and distortions of Examples 1 and 2 at the wide angle FIGS. 8(a) and 10(a), intermediate FIGS. 8(b) and 10(b) and telephoto FIGS. 8(c) and 10(c) settings during normal shooting are presented, and similar aberration diagrams of Examples 1 and 2 during panoramic shooting are shown in FIGS. 9(a)-9(c) and 11(a)-11(c).

As mentioned above, the present invention provides a zoom type of finder optical arrangement which, even when used on a camera designed to be capable of carrying out the conversion from the normal to panoramic shooting mode, or the reverse, can change the viewing screen frame for panoramic shooting to provide a precise indication of the shooting range within the finder; which, even when the viewing range is extended by increasing the magnification of finder, is less likely or unlikely to undergo aberration fluctuations and permits the eye point location to be unmoved so that the image is easy to view: and which is of simple mechanism and small size.

What I claim is:

1. A zoom type of optical view-finder apparatus comprising:

an objective lens system including a plurality of lens units and having a positive refracting power in general, wherein at least one of said plurality of lens units is movable along an optical axis of said objective lens system to thereby alter a focal length of said objective lens system between a first focal length representing a wide angle view for said optical view-finder apparatus to a second focal length representing a telephoto view for said optical view-finder apparatus;

a reflecting member for erecting an image formed by said objective lens system;

a light-shielding member located in a vicinity of said image formed by said objective lens system, for trimming to shield at least a region of said image; and an eyepiece system including:

a positive lens unit of positive refracting power, and a negative lens unit of negative refracting power, wherein said positive lens unit and said negative lens unit are movable along an optical axis of said eyepiece system to change a distance therebetween, thereby changing a magnification of said optical view-finder apparatus so as to enlarge said cut-out image, and which further satisfies the following condition (1):

$$1.5 < |f_M/f_P| < 5.0 \quad (1)$$

where $f_M$ is a focal length of said negative lens unit of said eyepiece system and $f_P$ is a focal length of said positive lens unit of said eyepiece system.

2. A zoom type of optical viewfinder apparatus as claimed in claim 1, wherein said eyepiece lens system comprises, in order from the object side:

a positive lens unit with a first air separation between said reflecting member and said positive lens unit; and a negative lens unit with a second air separation between said positive lens unit and said negative lens unit.

3. A zoom type of optical viewfinder apparatus as claimed in claim 2, wherein:

said positive lens unit is movable toward said object side in a conversion from a normal mode to a panoramic mode; and said negative lens unit is movable toward an image side in said conversion from said normal mode to said panoramic mode.

4. A zoom type of optical viewfinder apparatus as claimed in claim 1, wherein said eyepiece lens system comprises, in order from the object side:

a negative lens unit with a first air separation between said reflecting member and said negative lens unit; and a positive lens unit with a second air separation between said negative lens unit and said positive lens unit.

5. A zoom type of optical viewfinder apparatus as claimed in claim 4 wherein:

said negative lens unit is movable toward said object side in a conversion from a normal mode to a panoramic mode; and said positive lens unit is movable toward said object side in said conversion from said normal mode to said panoramic mode.

6. A zoom type of optical viewfinder apparatus as claimed in claim 5, wherein said second air separation becomes wider in said conversion from said normal mode to said panoramic mode.

7. A zoom type of optical viewfinder apparatus as claimed in claim 1, wherein:

said objective lens unit comprises a plurality of lens units that are movable along said optical axis for zooming said zoom type of optical viewfinder apparatus from a wide angle position to a telephoto position; and said eyepiece system is movable independently of said zooming, thereby performing said conversion from said normal mode to said panoramic mode, or from said panoramic mode to said normal mode.

8. A zoom type of optical viewfinder apparatus as claimed in claim 1, wherein:

a viewing screen frame is interposed between a surface of said objective lens system proximate to an image side and a surface of said eyepiece system proximate to said object side; and said light-shielding member for trimming shields at least a region of said viewing screen frame from light in association with said conversion from said normal mode to said panoramic mode, or from said panoramic mode to said normal mode.

* * * * *